Patented Apr. 27, 1943

2,317,733

UNITED STATES PATENT OFFICE 2,317,733

DYESTUFFS BECOMING GREEN WHEN CHROMED AND THEIR MANUFACTURE

Achille Conzetti and Guido Schetty, Basel, Switzerland, assignors to the firm J. R. Geigy A. G., Basel, Switzerland No Drawing. Application May 7, 1941, Serial No. 392,388. In Switzerland June 20, 1940

7 Claims. (Cl. 260—196)

In the specification of the U. S. patent application Ser. No. 347,310, filed July 24, 1940, there is described a process for the manufacture of monoazo dyestuffs which yield on wool, when after-chromed, green shades of excellent fastness to fulling, of very good fastness to light and good fastness to hot pressing, consisting in that these monoazo dyestuffs are made by coupling a diazotised 2-amino-1-hydroxybenzene-4-sulfonic acid being substituted in 5- or 6-position by halogen or an alkyl group with 2-aminonaphthalene-3-carboxylic acid. The coupling is advantageously performed in a medium neutral to Congo red in presence of pyridine and at a slightly raised temperature.

On further dealing with this matter, it has now been found that dyestuffs having equally good properties of fastness are obtained by using as diazo components instead of the 2-amino-1-hydroxybenzene-4-sulfonic acids substituted in 5- or 6-position by halogen or an alkyl group used in the manufacture described in the aforesaid specification 2-amino-1-hydroxybenzene-4- or -5-phenylsulfone or -sulfamide derivatives which furthermore contain outside the aminophenol nucleus a group imparting solubility in water in place of the closed sulfonic acid group in 4- or 5-position.

Accordingly there may be used as diazo components quite generally 2-aminophenol derivatives containing in 4- or 5-position the group $SO_2.X$. In this formula X means either a phenyl sulfonic acid or phenyl carboxylic acid residue which may further contain any desired further substituents such as halogen, nitro, alkoxy or alkyl groups, or an aliphatic or aromatic amide residue which contains a group imparting solubility in water and may contain if required further substituents such as halogen, alkyl, alkoxy and nitro groups. These orthoaminophenols may furthermore be substituted, for example by halogen, alkyl, alkoxy or nitro groups, preferably in 5- or 6-position in cases in which the $SO_2.X$ group is in 4-position, or in 4- or 6-position when this group is in 5-position of the aminophenol nucleus.

As known the technical utility of dyestuffs from diazotized ortho-aminophenol sulfonic acids and 2-aminonaphthalene-3-carboxylic acid depends on the position of the sulfonic acid group. Only those dyestuffs containing the sulfonic acid group in 4-position and halogen or an alkyl group in 5- or 6-position are completely free from the defect of yielding, depending on the acidity of the dyebath, quite different shades, which may vary from green over olive-green to yellow-green, when chromed with compounds of hexavalent chromium according to the usual methods. Dyestuffs containing nitro groups are quite useless owing to this unsatisfactory property.

The dyestuffs of the present invention, in comparison with those described in the aforesaid specification, have a still better resistance towards varying acidity of the dyebath. It is quite particularly surprising and unexpected that even the presence of a nitro group in the diazo component has no deleterious influence on the dyeing properties of the new dyestuffs.

The following examples illustrate the invention, the parts being by weight:—

Example 1

32.9 parts of 2-amino-1-hydroxybenzene-phenylsulfone-(4)-sulfonic acid-(3') are dissolved in 100 parts of water together with 4 parts of sodium hydroxide, 6.9 parts of sodium nitrite are added and the whole is introduced by drops into a mixture of ice and 30 parts of commercial hydrochloric acid. The resulting suspension of the crystallised diazo compound is brought to a reaction violet to Congo red by the addition of sodium bicarbonate and 9 parts of pyridine are added. Dissolution occurs with the production of a yellow solution which is then introduced at room temperature into a solution of 21.8 parts of the sodium salt of 2-amino-naphthalene-3-carboxylic acid in 120 parts of water. Coupling is finished after some hours and the dyestuff, which has in part separated as a red-brown precipitate is completely precipitated by the addition of common salt, filtered and dried. There are obtained 55-60 parts of a rust-red powder soluble in concentrated sulfuric acid to a violet-red solution. It dyes wool in an acid bath yellowish-red shades which become bluish-green when after-chromed.

Dyestuffs having similar properties are obtained if 2-amino-1-hydroxybenzene-3'-chloro- or 3'-methyl- or 3'-methoxy-phenylsulfone-(4)-sulfonic acid-(5') is used as diazo component instead of 2-amino-1-hydroxybenzene-phenylsulfone-(4)-sulfonic acid-(3').

EXAMPLE 2

30.8 parts of 2-amino-1-hydroxybenzene-sulfonic acid-(4)-anilide carboxylic acid-(2') are dissolved in 100 parts of water together with the calculated quantity of dilute caustic soda solution, 20 parts of a solution containing 6.9 parts of sodium nitrite are added and the whole is introduced by drops into a mixture of 30 parts of concentrated hydrochloric acid and 60 parts of ice at a temperature of 0–5° C. The diazo compound which has separated as a yellow precipitate is neutralized by the addition of sodium bicarbonate and introduced in portions at 0–5° C. into a solution of 21.8 parts of the sodium salt of 2-aminonaphthalene-3-carboxylic acid in 120 parts of water. The whole is stirred for 3 hours whilst cooling with ice, after which the reaction mixture no longer gives the diazo reaction. The whole is then allowed to warm to room temperature and precipitation of the dyestuff is completed by the addition of common salt. After filtering by suction and drying the dyestuff constitutes a red-brown powder which dissolves in concentrated sulfuric acid yielding a violet-red coloration. It dyes wool in an acid bath yellowish-red shades which become grass green when after-chromed. It is also excellently suited for dyeing according to the one-bath chroming process.

Instead of 2-amino-1-hydroxybenzene-sulfonic acid-(4)-anilide-carboxylic acid-(2'), there may also be used 2-amino-1-hydroxybenzene-sulfonic acid-(4)-N-methyl-N-($\beta$-sulfo)-ethylamide or 2-amino-1-hydroxybenzene-sulfonic acid-(4)-benzylamide-sulfonic acid-(4'). The dyestuffs thus obtained possess similar properties.

eneamide-carboxylic acid ethyl ester of melting point 124° C. By heating this product with dilute caustic soda solution to boiling and then acidifying there is obtained 1-hydroxy-2-nitrobenzene-sulfonic-acid-(4)-methyleneamide-carboxylic acid of melting point 153° C. which is reduced according to one of the usual methods to 2-amino-1-hydroxybenzene-sulfonic-acid-(4)-methyleneamide-carboxylic acid.

2-amino-1-hydroxybenzene-sulfonic-acid-(4)-anilide-carboxylic-acid-(3')

1-chloro-2-nitrobenzene-sulfonic-acid-chloride-(4) is introduced by portions in the course of 1–2 hours at 40–50° C. into a solution of the equivalent quantity of the sodium salt of 1-aminobenzene-carboxylic-acid-(3), the reaction being maintained neutral to weakly alkaline to litmus throughout by periodic addition of sodium carbonate. The condensation product is heated with the calculated quantity of dilute caustic soda solution to boiling and the nitrophenol so obtained is reduced by means of sodium sulphide.

If 1-monoethyl-aminobenzene-sulfonic-acid-(4), 1-monomethyl-aminobenzene-sulfonic acid-(4) or 1-monoethyl-aminobenzene-sulfonic acid-(3) is used instead of 1-aminobenzene-carboxylic acid-(3) the analogous products can be obtained according to the same process.

5-chloro-2-amino-1-hydroxybenzene-sulfonic-acid-(4)-ethylanilide-sulfonic acid-(3')

1:3-dichloro-6-nitrobenzene-sulfonic acid chloride-(4) (prepared by the action of phosphorus-penta-chloride on 1:3-dichloro-6-nitrobenzene-sulfonic-acid-(4)) is condensed with 1-mono-ethylaminobenzene-sulfonic-acid-(3) under the conditions indicated in the preceding example, the product is converted into the cor-

TABLE

*Composition of further dyestuffs with 2-aminonaphthalene-3-carboxylic acid as coupling component*

| Example | Diazo-component | Color of solution in concentrated sulfuric acid | Shade of the dyeing on wool | |
|---|---|---|---|---|
| | | | Acid | After-chromed |
| 3 | 2-amino-1-hydroxybenzene-sulfonic acid-(4)-methylene-amide-carboxylic acid. | Violet-red | Reddish-orange | Yellowish-green. |
| 4 | 2-amino-1-hydroxybenzene-sulfonic acid-(4)-anilide-carboxylic acid-(3'). | ...do | Yellowish-red | Grass-green. |
| 5 | 2-amino-1-hydroxybenzene-sulfonic acid-(4)-ethylanilide-sulfonic acid-(4'). | ...do | ...do | Bluish-green. |
| 6 | 2-amino-1-hydroxybenzene-sulfonic acid-(4)-methyl-anilide-sulfonic-acid-(4'). | ...do | ...do | Do. |
| 7 | 2-amino-1-hydroxybenzene-sulfonic acid-(4)-ethyl-anilide-sulfonic acid-(3'). | ...do | ...do | Do. |
| 8 | 5-chloro-2-amino-1-hydroxybenzene-sulfonic acid-(4)-ethylanilide-sulfonic acid-(3'). | ...do | Red | Grass-green. |
| 9 | 5-nitro-2-amino-1-hydroxybenzene-sulfonic acid-(4)-ethylanilide-sulfonic acid-(4'). | Bluish-red | Bluish-red | Olive-green. |
| 10 | 6-nitro-2-amino-1-hydroxybenzene-sulfonic acid-(4)-ethyl-anilide-sulfonic-acid-(4'). | ...do | ...do | Do. |
| 11 | 2-amino-1-hydroxybenzene-sulfonic acid-(5)-ethylanilide-sulfonic acid-(4'). | Violet-red | Red | Grass-green. |
| 12 | 2-amino-1-hydroxybenzene-sulfonic acid-(5)-anilide-carboxylic acid-(2'). | ...do | ...do | Do. |

The new 2-aminophenol derivatives used in the above examples may be made in the following manner:

2-amino-1-hydroxybenzene-sulfonic-acid-(4)-methylene-amide-carboxylic acid 1-chloro-2-nitrobenzene-sulfonic-acid-chloride-(4) is condensed in presence of anhydrous pyridine at a moderately raised temperature with glycine ethyl ester hydrochloride to form 1-chloro-2-nitrobenzene-sulfonic-acid-(4)-methylresponding ortho-nitrophenol by treatment with the calculated quantity of custic soda solution and the nitrophenol obtained is reduced according to the method of Béchamp.

5-nitro-2-amino-1-hydroxybenzene-sulfonic-acid-(4)-ethylanilide-sulfonic acid-(4')

2-amino-1-hydroxybenzene-sulfonic acid-(4)-ethylanilide sulfonic acid-(4') is treated with phosgene in presence of caustic soda solution whilst cooling with ice until a free amino group can no longer be detected; the benzoxazole-sulfonic acid-(5)-ethylanilide-sulfonic-acid-(4') thus formed is nitrated and the benzoxazole ring is again saponified by heating with an alkali solution to boiling.

*6-nitro-2-amino-1-hydroxybenzene-sulfonic-acid-(4)-ethylanilide-sulfonic-acid-(4')*

2 - amino - 1 -hydrobenzene-sulfonic-acid-(4)-ethylanilide-sulfonic-acid-(4') is acetylated with acetic anhydride to form 2-acetyl-amino-1-oxybenzene - sulfonic -acid-(4)-ethylanilide-sulfonic acid-(4'), this product is nitrated at a low temperature and the nitrated product is deacetylated by heating with an alkali solution to boiling.

*2-amino-1-oxybenzene-sulfonic-acid-(5)-ethylanilide-sulfonic-acid-(4')*

Benzoxazolone is converted into benzoxazolone - sulfonic - acid - chloride-(6) by treatment with chloro-sulfonic acid at a moderate temperature, the resulting acid chloride is caused to react in the manner above indicated with 1-amino-ethylaminobenzene - sulfonic - acid - (4) and the condensation product is deacylated by heating with an alkali solution.

The corresponding product is obtained by using 1-aminobenzene - carboxylic-acid-(2) instead of 1-amino-ethylaminobenzene-sulfonic-acid-(4).

What we claim is:

1. Process for the manufacture of dyestuffs which become green when chromed, consisting in coupling a diazotised 2-aminophenol, substituted in one of the positions 4 and 5 by a substituent containing a group imparting solubility in water selected from the group consisting of arylsulfone-radicals of the benzene series and sulfamide-radicals attached via the SO2 group of the aliphatic series containing at most three carbon atoms and of the benzene series, with 2-aminonaphthalene-3-carboxylic acid.

2. The azodyestuffs of the following general formula

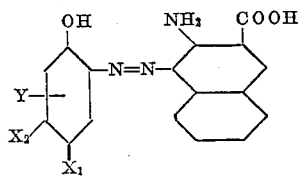

wherein one of the substituents X1 and X2 means a radical containing a group imparting solubility in water, selected from the group consisting of arylsulfone-radicals of the benzene series and sulfamide-radicals attached via the SO2 group of the aliphatic series containing at most three carbon atoms and of the benzene series, the other of the substituents X1 and X2 being H and wherein Y means one of the group consisting of H, Cl and NO2 being red to red-brown powders, dissolving in concentrated sulfuric acid with bluish-red to violet-red color and dyeing wool in an acid bath orange to red shades which, when after-chromed, turn to green shades of excellent fastness properties.

3. The azodyestuffs of the following general formula

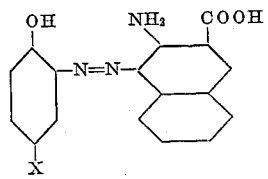

wherein X means a radical containing a group imparting solubility in water, selected from the group consisting of arylsulfone-radicals of the benzene series and sulfamide-radicals attached via the SO2 group of the aliphatic series containing at most three carbon atoms and of the benzene series, being red to red-brown powders, dissolving in concentrated sulfuric acid with bluish-red to violet-red color and dyeing wool in an acid bath orange to red shades which, when after-chromed, turn to green shades of excellent fastness properties.

4. The azodyestuffs of the following general formula

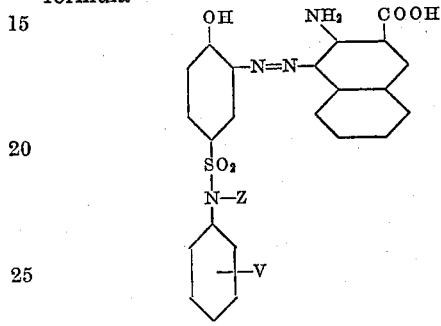

wherein Z means one of the group consisting of H, CH3 and C2H5 and V means one of the group consisting of COOH and SO3H, being red to red-brown powders, dissolving in concentrated sulfuric acid with bluish-red to violet-red color and dyeing wool in an acid bath orange to red shades which, when after-chromed, turn to green shades of excellent fastness properties.

5. The azodyestuff of the formula

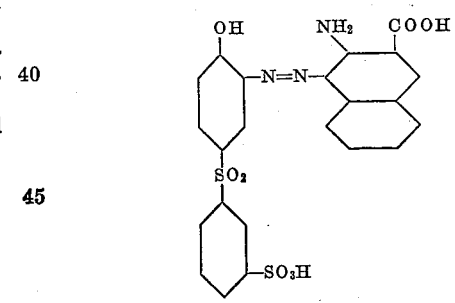

being a rust-red powder, soluble in concentrated sulfuric acid to a violet-red solution, dyeing wool in an acid bath yellowish-red shades which, when after-chromed, turn to bluish-green shades of excellent fastness properties.

6. The azodyestuff of the formula

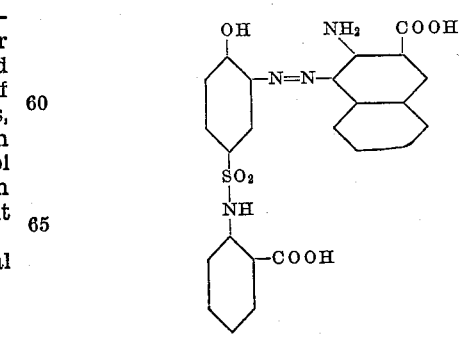

being a red-brown powder, soluble in concentrated sulfuric acid to a violet-red solution, dyeing wool in an acid bath yellowish-red shades, which, when after-chromed, turn to grass-green shades of excellent fastness properties.

7. The azodyestuff of the formula
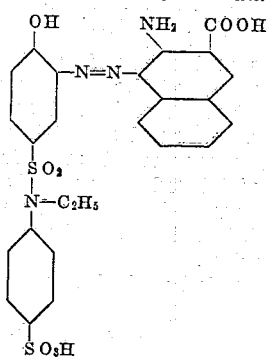
being a red powder, soluble in concentrated sulfuric acid to a violet-red solution, dyeing wool in an acid bath yellowish-red shades which, when after-chromed, turn to bluish-green shades of excellent fastness properties.
ACHILLE CONZETTI.
GUIDO SCHETTY.